TAPE FEEDING AND SEVERING MECHANISM FOR MARKING MACHINES

Filed May 18, 1948 5 Sheets-Sheet 1

INVENTOR.
PHILIP N. BRAUN
BY Bodell & Thompson
Attorneys

Nov. 20, 1951

P. N. BRAUN 2,575,407

TAPE FEEDING AND SEVERING MECHANISM
FOR MARKING MACHINES

Filed May 18, 1948

5 Sheets-Sheet 2

INVENTOR.
PHILIP N. BRAUN
BY Bodell & Thompson
Attorneys

INVENTOR.
PHILIP N. BRAUN
BY Bodell & Thompson
Attorneys

INVENTOR.
PHILIP N. BRAUN
BY Bodell & Thompson
Attorneys

Nov. 20, 1951

P. N. BRAUN
TAPE FEEDING AND SEVERING MECHANISM
FOR MARKING MACHINES 2,575,407

Filed May 18, 1948

5 Sheets-Sheet 5

INVENTOR.
PHILIP N. BRAUN
BY Bodell & Thompson
Attorneys

Patented Nov. 20, 1951 2,575,407

UNITED STATES PATENT OFFICE 2,575,407

TAPE FEEDING AND SEVERING MECHANISM FOR MARKING MACHINES

Philip N. Braun, Syracuse, N. Y.

Application May 18, 1948, Serial No. 27,685

2 Claims. (Cl. 164—42)

This invention relates to tape feeding and cutting mechanism for marking machines used for printing identifying characters, numbers, letters, etc., on a tape, or tags, which are attached to articles to be laundered, or dry cleaned, which machines are of the type embodying a platen on which the tag is placed, movable toward and from the type set in the printing line of the type carrying members, as type wheels, of a marking machine.

The invention has for its object a feeding mechanism mounted on the carrier for the platen and including a supply holder for the blank tape, with the end portion portion or length thereof trained to extend across the platen, and means coacting with the tape to feed it during the movement of the platen and carrier rearwardly away from the printing line, and cutting means including a knife carried by the platen carrier and movable successively to the tape feeding means to sever the printed portion of the tape which, prior to the feeding of the tape, was on the platen and printed during the forward movement of the platen carrier toward the printing line.

It further has for its object features of constructions and arrangements of parts hereinafter set forth and claimed.

The invention consists in the novel features and in the combinations and constructions hereinafter set forth and claimed.

In describing this invention, reference is had to the accompanying drawings in which like characters designate corresponding parts in all the views.

Figures 1, 2:
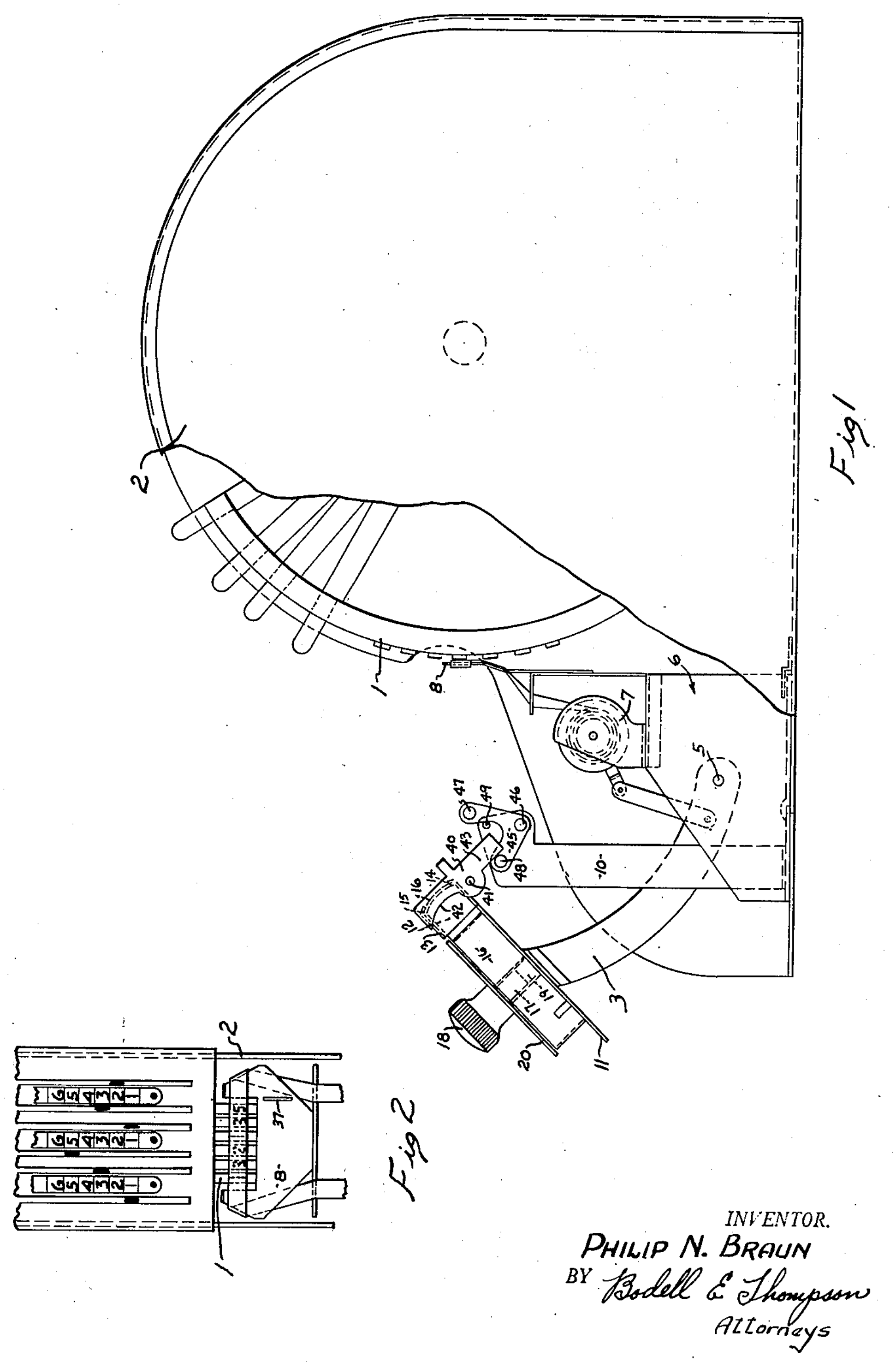
Figure 1 is a side elevation, partly broken away, of a marking machine embodying the tape feeding and cutting mechanism.
Figure 2 is a fragmentary elevation, looking to the right Figure 1, showing the type wheels and a portion of the guide for the inking ribbon.

This invention comprises tape feeding mechanism and tape severing mechanism located on opposite sides of a carrier for a printing platen, which carrier is operable to carry the platen toward and from type on type carrying members, or wheels, of a marking machine, the tape feeding from a supply roll on the platen carrier transversely of the platen with respect to the direction of movement of the carrier, the feeding mechanism for the tape being operated by the carrier during the first part of the return movement taking the platen away from the printing line, and means operated during the last part of the return movement of the platen carrier after the tape feeding operation is completed to actuate a knife to shear off that portion of the tape printed during the forward movement of the platen carrier.

The machine here illustrated, to which the tape feeding and cutting mechanism is applied, comprises type wheels 1 mounted in a casing 2 on a horizontal axis and shiftable to bring selected type on their peripheries to the printing line, a platen carrier 3 mounted to carry a platen 4 toward and from the printing line. The article to be printed overlies the platen and receives imprints from the type at the printing line. The platen carrier is shown as an upright lever arm pivoted at 5 to a frame 6 mounted in the casing 2 and also supporting ink ribbon feed mechanism 7 of any suitable construction. The ribbon mechanism includes a flexible guide 8 to guide the ribbon across the type at the printing line.

The frame 6 includes supports 9, 10, for parts of the tape feeding and cutting mechanism. The platen carrier 3 comprises a head at its upper end, the head consisting of a base plate 11, a boxlike block 12 on the front margin of the plate 11 toward the printing line, a top plate 13 for the block, a holder for the tape supply, and a handle for operating the carrier. The front wall of the block constitutes the platen 4. The front margins of the base plate and the top plate, that is the margins toward the printing line, extend beyond the face of the platen 4 and are undercut to provide guide grooves 14, 15, for the margins of the tape 16, as it passes across the face of the platen 4. The tape 16 feeds from a supply, as a roll having a central tubular core through which extends a hollow stem 17 of a handle or knob 18, the stem threading onto a stud 19 rising from the base plate 11. The handle 18 has a cover plate or disk 20 for the roll of tape. The roll turns about the stem under the pull of the feeding mechanism on the table. The stem is a holder for the tape. The handle 18, and its stem or tape holder 17, are located to the rear of the platen 4 with respect to the forward movement of the platen carrier to the printing line. The tape 16 extends from the roll tangentially forward along one side of the carrier and then laterally over the platen 4 to the other side of the carrier. The tape feeding mechanism coacts with the tape between the platen 4 and the roll and preferably in the angle of the tape.

Figure 9:
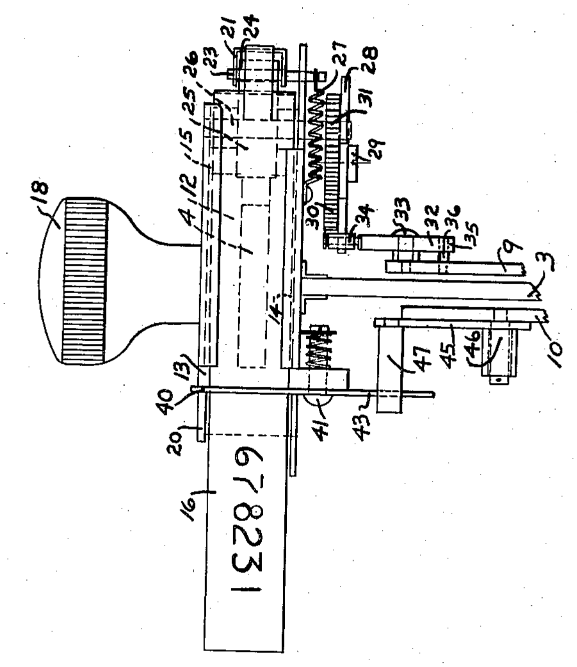
Figure 9 is a fragmentary elevation of the platen carrier looking rearward, or from the right of the platen carrier, Figure 4.
Figure 7:
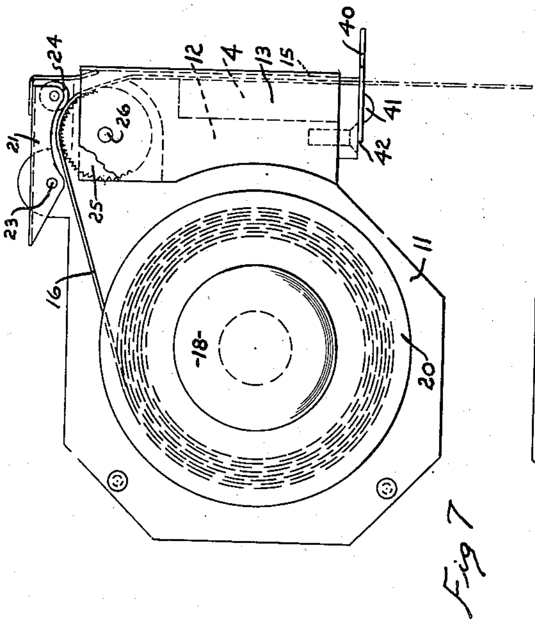
Figures 7 and 8 are plan and inverted plan views respectively of the platen carrier shown in Figure 4.
Figure 8:
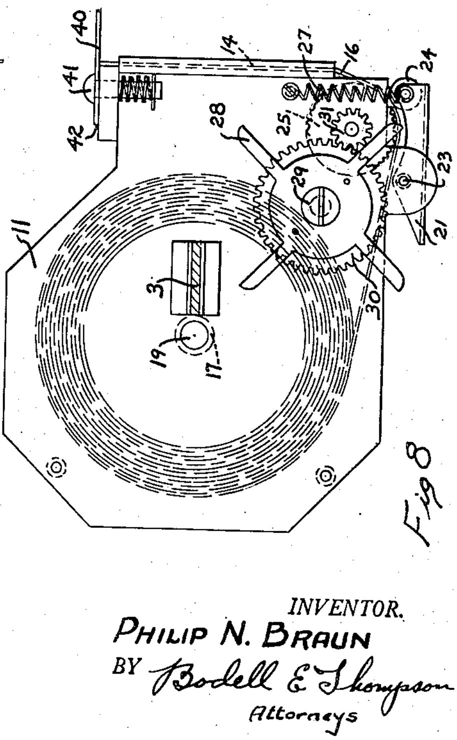
Figure 13:
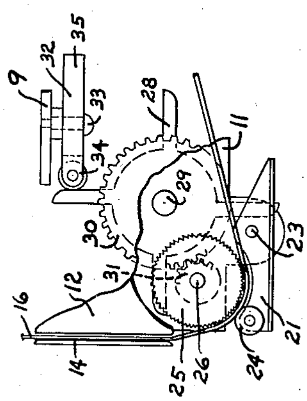
Figure 13 is a sectional view on line 13—13, Figure 12.

The tape feeding mechanism comprises opposing members pressing against the outer and inner sides of the tape, one of them being rotatable to feed the tape. 21 and 25 designate the members, see Figures 8 and 13, these being mounted on the carrier, or the base plate 11 thereof, at one side, as the left side of the carrier, Figure 7, and at one end as the left end Figure 7 of the platen 4, the member 21 being a lever pivoted at 23 to the carrier and having a roller 24 for pressing against the outer side of the tape at the angle between the tangential portion and lateral portion of the tape. The other member 25 is a wheel with a roughened periphery mounted on an axle or spindle 26 mounted between the top plate 13 and the base plate 11 in position for its periphery to press against the inner side of the angle in the tape. One of the members is spring pressed toward the other, and as here shown the lever member 21 is acted upon by a spring 27, Figure 9, to press it toward the wheel 25. By reason of the spring pressure ana the roughened or knurled periphery of the wheel 25, the tape is fed during the rotation of the wheel. The wheel 25 is actuated by a ratchet wheel 28, see Figures 10, 11 and 12, mounted by means of a pin or axle 29 on the lower side of the base plate 11, and motion transmitting means between the ratchet wheel and the feeding wheel 25 and means, as a pawl on the support 9 and ratcheting idly relative to the ratchet wheel during the forward movement of the carrier 3 and coacting with the ratchet wheel 28 to turn it during the first part of the retrograde movement of the carrier 3 to carry the carrier and tape thereon away from the type wheel.

Figure 10:
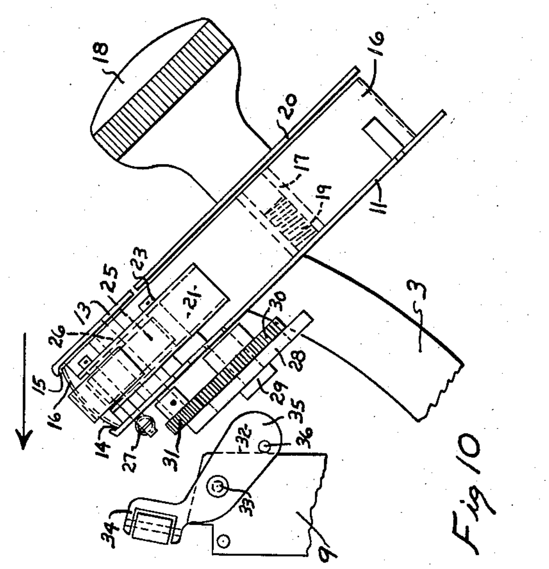
Figure 10 is a fragmentary opposite side elevation to that shown in Figure 3, the pawl of the tape feed mechanism being shown in normal, or idle, position.
Figures 11, 12:
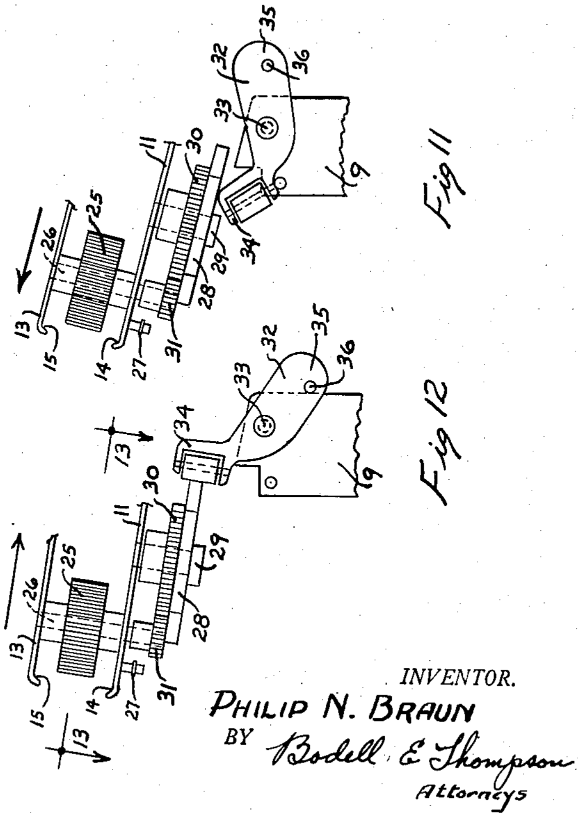
Figures 11 and 12 are fragmentary elevations of parts seen in Figure 10, parts being omitted, showing respectively the ratcheting of the feeding pawl during the forward movement of the platen carrier, and the position of the pawl to actuate the tape feeding mechanism during the initial part of the return or rearward movement of the platen carrier away from the printing line.

The motion transmitting means between the ratchet wheel 28 and the feeding wheel 25, as here illustrated, comprises a gear 30 mounted on the pin or axle 29 of the ratchet wheel 28, a pinion 31 mounted on the spindle 26 of the feed wheel 25 and meshing with the wheel 30. The pawl for coacting with the ratchet wheel 28 is designated 32, this being pivoted at 33 to the support 9 at the left side of the carrier 3, and having an arm 34 coacting with the ratchet wheel during the retrograde or return movement of the carrier. The pawl has a weighted end at 35 which acts to return it into the path of the ratchet wheel. The pawl is limited in its pivotal movement towards starting position by a stop pin 36 thereon engaging the support 9. During the forward movement of the carrier 3, the pawl 32 ratchets out of operative position, as shown in Figures 10 and 11, and at the end of the forward movement shifts under the weight 35 back into position to coact with the pawl during the retrograde movement of the pawl, that is, into the position shown in Figure 12, so that during retrograde movement of the carrier 3, the ratchet wheel is actuated and the tape fed across the platen a given amount. The portion of the tape that was over the platen, during the printing operation, is fed laterally beyond the end of the platen, see Figure 7. The feeding movement of the tape occurs during the first part of the retrograde movement of the carrier.

Figure 3:
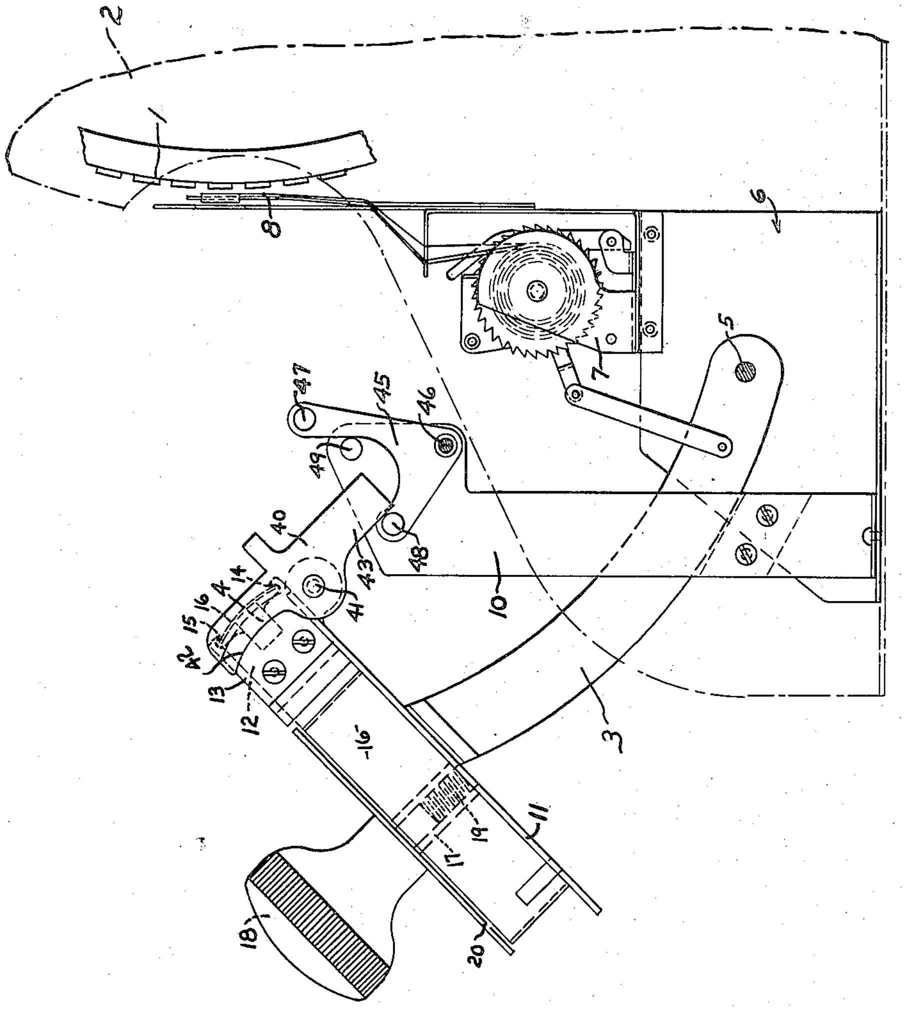
Figure 3 is an enlarged elevation of the platen carrier and tape mechanism, the carrier being shown in starting position, the adjacent portion of the marking machine and the ink ribbon mechanism being also shown.
Figure 4:
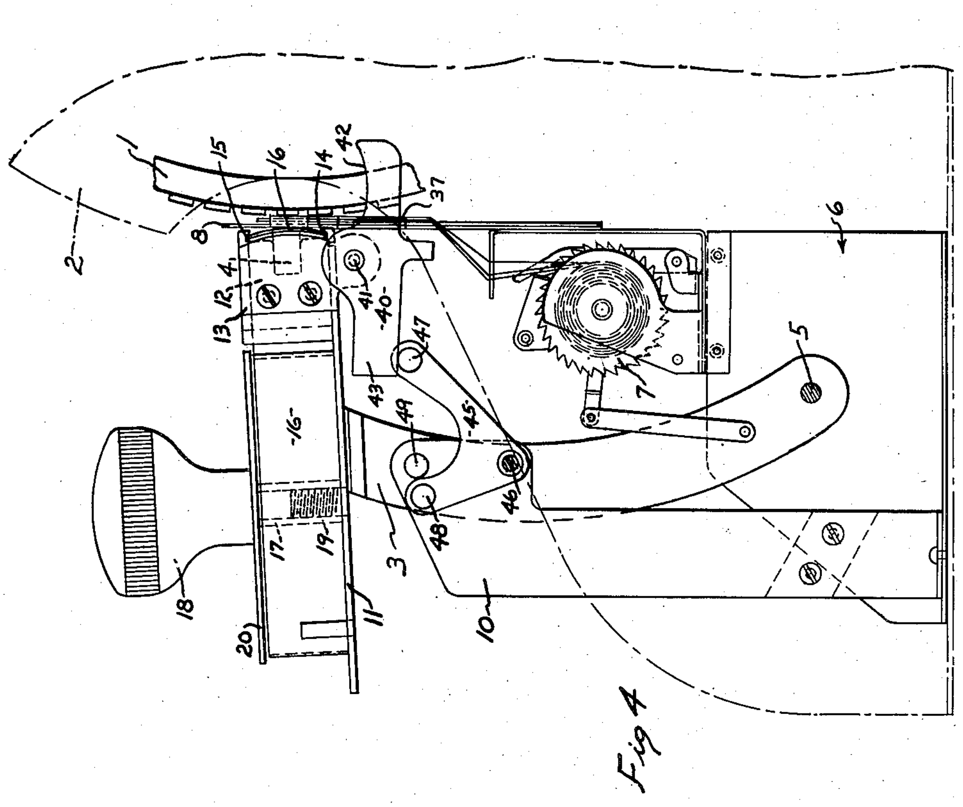
Figure 4 is a view, similar to Figure 3, showing the platen carrier as moved forward to the limit of its movement to carry the platen to the printing line of the type wheels, and the operation of the cutter mechanism to set the knife preliminary to the cutting operation of the knife during the return movement of the platen carrier to starting position, Figure 3.
Figure 5:
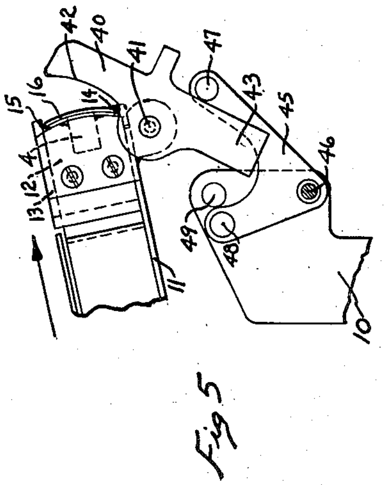
Figures 5 and 6 are fragmentary elevations of the platen carrier showing the knife in its position assumed when the platen carrier has moved about three-quarters of its way toward the printing line, and Figure 6 showing the position of the knife as the platen carrier approaches the end of its return movement away from the printing line.
Figure 6:
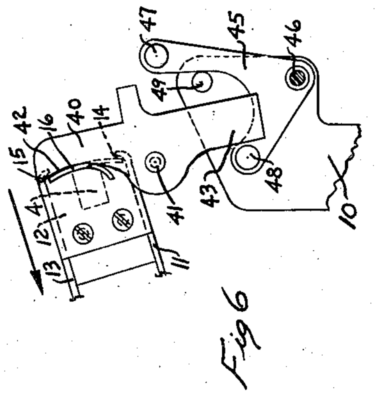

The cutting mechanism comprises a knife for shearing off the printed projecting portion of the tape during the latter part of the retrograde movement of the carrier 3, or after the feeding movement has been completed. The cutting mechanism includes a knife 40, best seen in Figures 3, 4, 5 and 6, the knife being shown as a lever pivoted at 41 between its ends to the platen carrier, or the base plate 11 at the front edge thereof below the platen surface 4, the upper arm of the lever formation having a shearing edge at 42, and the lower arm coacting with actuating mechanism mounted on the support 10. The knife is normally in the position shown in Figure 3 when the platen carrier is in starting position. The actuating mechanism for the knife operates to move the knife about its pivot 41 into the position shown in Figure 4, during the movement of the knife forward with the carrier, in which position the cutting edge of the knife has moved forward into operative position so as not to interfere with the printing operation. The knife is now in a horizontal position and enters a slot 37 in the casing lapping the right type wheel. The shifting of the knife to horizontal position is merely to locate it so that it will not interfere with the platen during the printing movement of the carrier. During the first part of the rearward operation of the carrier 3, the feed of the tape occurs, feeding the printed portion of the tape off the platen beyond one edge thereof into the path of the knife. During the latter part of the rearward movement of the platen carrier 3, the knife moves successively through the positions shown in Figures 5 and 6, shearing off the printed end portion of the tape, as seen in Figure 6.

The actuating mechanism for the knife acts to shift the knife on its pivot 41 and is carried by the support 10 on the opposite side of the platen carrier 3, or the head therefor, from the tape feed actuator or pawl, and includes a rocking member, as a lever 45, pivoted at 46 to the support 10 and having spaced apart shoulders 47 and 48 which coact with the arm 43 of the knife to move the knife about its pivot 41 during the movement of the carrier. The rocking movement of the lever is limited by a stop pin 49. The lever is in the form of a bell crank pivoted at its angle, and the shoulders 47, 48, are carried at the end of the angular arms on the lever. During the forward movement of the carrier 3, the knife 40 moves from the position shown in Figure 3 about its pivot. The lever 45 is in starting position with the arm carrying the shoulder 47 against the stop 49. As the carrier 3, or its end, moves forward toward the printing line, the lower arm 43 of the knife contacts the shoulder 47 and swings the knife about its pivot 41 clockwise, Figure 5, and also the actuating lever 45 is moved forwardly, or clockwise, about its pivot 46, bringing the arm with the shoulder 48 against the stop 49. During continued forward movement of the carrier 3, the knife swings farther about its pivot 41, and the shoulder 47 on the now stopped actuating lever 45 causes it to tilt the knife into horizontal position. Then further and final actuation of the carrier 3 brings the platen with the tape thereon into imprint receiving position against the ink ribbon and type.

During retrograde movement of the carrier 3, the knife 40 first is moved rearward horizontally, the shoulder 47 holding it from tilting the knife while in horizontal position sliding along the shoulder 47, and tilting slowly when clear of the casing or slot 37 therein, the tilting being facilitated by the weight of the arm 43 of the knife and the travel of the knife along the shoulder 47 of the actuating lever 45. During rearward movement of the carrier 3 and the tilting of the knife about its pivot, an angular arm approaches the shoulder 47. During further continued rearward movement of the carrier 3, the arm 43 of the knife leaves the shoulder 47 and takes up lost motion or space between the shoulders 47, 48, of the lever 45, shifting the lever 45 into the stopped position shown in Figure 6. The final movement of the carrier 3 causes the knife to fulcrum on the stop 48 and the knife edge to shear off the printed end of the tape from the lower edge toward the upper. The tape has been fed to feed the printed end off the platen 4 and a blank end onto the platen during the first part of the retrograde movement of the carrier while the knife is shifting from the position shown in Figure 4 into a position similar to that shown in Figure 5.

In the general operation, the type wheels are manipulated to set selected type at the printing line. The carrier 3 is shifted forward by pushing on the handle 18. During the first part of the forward movement, the knife shifts from the position shown in Figures 1 and 3 into the position shown in Figure 4, and during the last part of the forward movement, the platen and tape thereon is pressed against the ink ribbon. During the first part of the retrograde movement of the carrier 3 effected by pulling rearward on the handle 18, the tape feeding mechanism operated to feed a blank end of the tape over the platen and the printed end off the platen, and brings the knife toward but short of cutting position, Figure 5. During the last portion of the retrograde movement of the carrier 3, the knife is actuated to cut off the printed portion of the tape, Figure 6.

What I claim is:

1. A tape feeding mechanism for machines of the class described, said mechanism comprising a frame, a shiftable carrier on the frame having a forward and rearward movement, a platen carried by the carrier, a tape supply also supported by the carrier in the rear of the platen, the outer length of the tape extending across the platen, a feed wheel mounted on the carrier and engaging the tape at one end of the platen between the platen and the tape supply, and actuating means for the feed wheel comprising a star wheel mounted on the carrier, gearing between the star wheel and the feed wheel, a pawl pivoted to the frame and having an end located in the path of an arm of the star wheel, and means on the frame to shift the pawl out of said path during forward movement of the carrier, the pawl having means for returning it to starting position in the path of an arm of the star wheel during rearward movement of the carrier, a stop for limiting the pivotal movement of the pawl when the pawl is in the path of the arm of the star wheel during rearward movement of the carrier so that the pawl engages an arm of the star wheel and turns the ratchet wheel about its axis to actuate the feed wheel.

2. A tape feeding mechanism for machines of the class described, said mechanism comprising a frame, a shiftable carrier on the frame having a forward and rearward movement, a platen carried by the carrier, a tape supply also supported by the carrier in the rear of the platen, the outer length of the tape extending across the platen, a feed wheel mounted on the carrier and engaging the tape at one end of the platen between the platen and the tape supply, and actuating means for the feed wheel comprising a star wheel mounted on the carrier, gearing between the star wheel and the feed wheel, a pawl pivoted to the frame and having an end located in the path of an arm of the star wheel, and means on the frame to shift the pawl out of said path during forward movement of the carrier, the pawl having means for returning it to starting position in the path of an arm of the star wheel during rearward movement of the carrier, a stop for limiting the pivotal movement of the pawl when the pawl is in the path of the arm of the star wheel during rearward movement of the carrier so that the pawl engages an arm of the star wheel and turns the ratchet wheel about its axis to actuate the feed wheel, a knife pivoted to the platen on the opposite end thereof to that on which the feed wheel is located, the knife being located to sever the tape fed by the feed wheel and mechanism carried by the frame and coacting with the knife to actuate it to sever the tape fed off the platen, said actuating mechanism for the knife being located to actuate the knife after the carrier has been shifted far enough to cause the tape feeding mechanism to feed the tape.

PHILIP N. BRAUN.

REFERENCES CITED

The following references are of record in the file of this patent:

UNITED STATES PATENTS

| Number | Name | Date |
|---|---|---|
| 948,944 | Moore | Feb. 8, 1910 |
| 1,714,143 | Schramm | May 21, 1929 |
| 1,819,561 | Krell | Aug. 18, 1931 |
| 1,968,669 | Arnold | July 31, 1934 |
| 1,996,306 | Rubens | Apr. 2, 1935 |
| 2,080,056 | Miller | May 11, 1937 |
| 2,108,400 | Barker-Bland | Feb. 15, 1938 |
| 2,110,228 | Lakeman et al. | Mar. 8, 1938 |
| 2,121,864 | Flood | June 28, 1938 |
| 2,435,434 | Kosmer | Feb. 3, 1948 |